United States Patent
Shimezawa et al.

(10) Patent No.: US 9,680,539 B2
(45) Date of Patent: Jun. 13, 2017

(54) TERMINAL, BASE STATION, COMMUNICATION SYSTEM AND COMMUNICATION METHOD

(75) Inventors: Kazuyuki Shimezawa, Osaka (JP); Toshizo Nogami, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 14/009,852

(22) PCT Filed: Apr. 2, 2012

(86) PCT No.: PCT/JP2012/058864
§ 371 (c)(1),
(2), (4) Date: Oct. 4, 2013

(87) PCT Pub. No.: WO2012/137709
PCT Pub. Date: Oct. 11, 2012

(65) Prior Publication Data
US 2014/0023157 A1    Jan. 23, 2014

(30) Foreign Application Priority Data

Apr. 5, 2011   (JP) .................................. 2011-083401

(51) Int. Cl.
*H04B 7/02* (2017.01)
*H04L 1/02* (2006.01)
(Continued)

(52) U.S. Cl.
CPC ..... *H04B 7/0456* (2013.01); *H04L 25/03949* (2013.01); *H04B 7/0486* (2013.01);
(Continued)

(58) Field of Classification Search
USPC .......................................................... 375/267
See application file for complete search history.

(56) References Cited

U.S. PATENT DOCUMENTS

2008/0153428 A1* 6/2008 Han et al. .................... 455/69
2009/0257383 A1* 10/2009 Lee et al. ..................... 370/329
(Continued)

FOREIGN PATENT DOCUMENTS

| JP | 2010-537599 A | 12/2010 |
|---|---|---|
| WO | 2009/119973 A1 | 10/2009 |

(Continued)

OTHER PUBLICATIONS

Official Communication issued in International Patent Application No. PCT/JP2012/058864, mailed on Jun. 12, 2012.
(Continued)

*Primary Examiner* — Tanmay Shah
(74) *Attorney, Agent, or Firm* — Keating & Bennett, LLP

(57) ABSTRACT

In a communication system in which a base station is able to adaptively control a terminal, a base station, a terminal, a communication system and a communication method which are capable of efficiently supporting a precoding process are provided. The terminal that communicates with the base station selects any of a plurality of codebook subsets obtained by code-booking a precoding weight known to both the base station and the terminal, on the basis of control information which is set by the base station.

10 Claims, 6 Drawing Sheets

(51) Int. Cl.
    *H04B 7/0456*     (2017.01)
    *H04L 25/03*     (2006.01)
    *H04B 7/06*     (2006.01)
    *H04L 1/00*     (2006.01)
    *H04L 1/06*     (2006.01)
    *H04B 7/04*     (2017.01)

(52) U.S. Cl.
    CPC .......... *H04B 7/0639* (2013.01); *H04L 1/0026* (2013.01); *H04L 1/0618* (2013.01); *H04L 2025/03808* (2013.01)

(56) References Cited

U.S. PATENT DOCUMENTS

| | | | |
|---|---|---|---|
| 2010/0166094 A1* | 7/2010 | Lee | H04B 7/0671 375/267 |
| 2010/0284351 A1 | 11/2010 | Liang et al. | |
| 2011/0317581 A1 | 12/2011 | Hoshino et al. | |
| 2012/0140723 A1* | 6/2012 | Taoka et al. | 370/329 |
| 2013/0094464 A1* | 4/2013 | Li | H04B 7/066 370/329 |
| 2013/0136203 A1* | 5/2013 | Chen | H04B 7/0639 375/285 |

FOREIGN PATENT DOCUMENTS

| | | |
|---|---|---|
| WO | 2009/125956 A1 | 10/2009 |
| WO | 2010/024582 A2 | 3/2010 |
| WO | 2010/106729 A1 | 9/2010 |

OTHER PUBLICATIONS

3GPP TS 36.213 V10.0.1, "3rd Generation Partnership Project; Technical Specification Group Radio Access Network; Evolved Universal Terrestrial Radio Access (E-UTRA); Physical layer procedures (Release 10)", Dec. 2010, 98 pages.

3GPP TS 36.211 V10.0.0, "3rd Generation Partnership Project; Technical Specification Group Radio Access Network; Evolved Universal Terrestrial Radio Access (E-UTRA); Physical channels and modulation (Release 10)", Dec. 2010; 103 pages.

"Possible Refinement on 8Tx Codebook Design," 3GPP TSG RAN WG1 60bis, Apr. 12-16, 2010, pp. 1-7.

"Progressing on CSI Feedback for Rel. 10 Downlink MIMO," 3GPP TSG RAN WG1 62, Aug. 23-27, 2010, pp. 1-4.

Huawei, "Remaining Control Signalling Issues for Close-Loop SM", 3GPP TSG RAN WG1 Meeting #53bis, R1-082354, Jun. 30-Jul. 4, 2008, 2 pages.

Huawei, "Performance Evaluation of Adaptive Codebook as Enhancement of 4 Tx Feedback", 3GPP TSG RAN WG1 #61bis, R1-103447, Jun. 28-Jul. 2, 2010, 6 pages.

Samsung, "Control Signaling to Support Feedback Enhancements in Rel. 10", 63GPP TSG RAN WG1, Meeting #61, R1-103379, May 10-14, 2010, pp. 1-13.

3rd Generation Partnership Project, Technical Specification Group Radio Access Network, "Evolved Universal Terrestrial Radio Access (E-UTRA), Physical Layer Procedures (Release 10)", 3GPP TS 36.213 V10.1.0, Mar. 2011, 7 pages.

\* cited by examiner

FIG. 6

|  |  | RANK | |
|---|---|---|---|
|  |  | 1 | 2 |
| CODEBOOK INDEX | 0 | W1_10 | — |
|  | 1 | W1_11 | W1_21 |
|  | 2 | W1_12 | W1_22 |
|  | 3 | W1_13 | — |

FIG. 7

| CODEBOOK INDEX | PMI1 | PMI2 |
|---|---|---|
| 0 | $W_0$ | $\phi_0$ |
| 1 | $W_1$ | $\phi_1$ |
| 2 | $W_2$ | $\phi_2$ |
| 3 | $W_3$ | $\phi_3$ |
| 4 | $W_4$ | $\phi_4$ |
| ⋮ | ⋮ | ⋮ |
| 15 | $W_{15}$ | $\phi_{15}$ |

US 9,680,539 B2

TERMINAL, BASE STATION, COMMUNICATION SYSTEM AND COMMUNICATION METHOD

TECHNICAL FIELD

The present invention relates to a terminal, a base station, a communication system and a communication method.

BACKGROUND ART

In wireless communication systems such as WCDMA (Wideband Code Division Multiple Access), LTE (Long Term Evolution) and LTE-A (LTE-Advanced) using 3GPP (Third Generation Partnership Project), and Wireless LAN and WiMAX (Worldwide Interoperability for Microwave Access) using IEEE (The Institute of Electrical and Electronics engineers), base stations (cell, transmission station, transmission device, and eNodeB) and terminals (mobile terminal, reception station, mobile station, reception device, and UE (User Equipment)) are provided with a plurality of transmitting and receiving antennas, and thus high-speed data transmission can be realized by MIMO (Multi Input Multi Output) technology.

In such a wireless communication system, a channel state between a base station and a terminal is measured by using channel-state-measurement reference signals (CSI-RS (Channel State Information-Reference Signal), pilot signal, and known signal) constituted by signals which are known between the base station and the terminal. In addition, in the wireless communication system, a modulation and coding scheme (MCS (Modulation and Coding Scheme)), the number of spatial multiplexes (the number of layers, the number of ranks), and precoding weight (precoding matrix, precoder) and the like are adaptively controlled on the basis of the measurement results thereof, thereby allowing more efficient data transmission to be realized.

A method disclosed in, for example, NPL 1 can be used.

A base station transmits (reports) a channel-state-measurement reference signal through a downlink. A terminal measures a channel state of the downlink on the basis of the channel-state-measurement reference signal received in the base station. The terminal transmits (feeds back) information (feedback information, or report) for adaptive control to the base station through an uplink. Particularly, a precoding process of the base station with respect to the terminal is suitably adaptively controlled, and thus reception quality in the terminal is improved.

In order to efficiently perform adaptive control in the precoding process, the base station and the terminal hold in advance a plurality of precoding weights code-booked, and the terminal feeds back information (index) indicating the precoding weight to the base station. In such code-booked precoding weights, a method disclosed in NPL 2 can be used.

CITATION LIST

Non Patent Literature

NPL 1: 3rd Generation Partnership Project; Technical Specification Group Radio Access Network; Evolved Universal Terrestrial Radio Access (E-UTRA); Physical layer procedures (Release 10), December, 2010, 3GPP TS 36.213 V10.0.1 (2010-12)

NPL 2: 3rd Generation Partnership Project; Technical Specification Group Radio Access Network; Evolved Universal Terrestrial Radio Access (E-UTRA); Physical channels and modulation (Release 10), December 2010, 3GPP TS 36.211 V10.0.0 (2010-12)

SUMMARY OF INVENTION

Technical Problem

In order to realize a communication system capable of performing a plurality of communication schemes, it is preferable to be able to select a suitable precoding weight. However, in communication systems of related art, only one type of code-booked precoding weight is used, which results in an impediment to an improvement in transmission efficiency.

The present invention is contrived in view of the above problem, and an object thereof is to provide a terminal, a base station, a communication system and a communication method which are capable of efficiently supporting a precoding process in a communication system in which a base station can adaptively control a terminal.

Solution to Problem (1) The present invention is contrived to solve to the above problem, and according to one aspect of the present invention, there is provided a terminal that communicates with a base station, wherein any of a plurality of codebook subsets obtained by code-booking a precoding weight known to both the base station and the terminal is selected on the basis of a communication mode which is set by the base station.

(2) In addition, in the terminal according to one aspect of the present invention, a channel state between the base station and the terminal is measured on the basis of a channel-state-measurement reference signal transmitted by the base station, and feedback information is generated on the basis of the channel state and the selected codebook subset.

(3) According to one aspect of the present invention, there is provided a terminal that communicates with a base station, wherein any of a plurality of codebook subsets obtained by code-booking a precoding weight known to both the base station and the terminal is selected on the basis of control information indicating whether an X-PDCCH region which is set by the base station is set.

(4) In addition, in the terminal according to one aspect of the present invention, a channel state between the base station and the terminal is measured on the basis of a channel-state-measurement reference signal transmitted by the base station, and feedback information is generated on the basis of the channel state and the selected codebook subset.

(5) In addition, in the terminal according to one aspect of the present invention, the X-PDCCH region is a region in which the base station is able to transmit control information from the base station to the terminal, using a portion of a resource capable of mapping an information data signal to the terminal.

(6) In addition, in the terminal according to one aspect of the present invention, the X-PDCCH region is a region capable of transmitting a signal obtained by multiplexing a terminal-specific reference signal specific to the terminal to control information from the base station to the terminal.

(7) According to one aspect of the present invention, there is provided a base station that communicates with a terminal, wherein the base station sets a communication mode with respect to the terminal, transmits a channel-state-measurement reference signal to the terminal, and receives feedback information which is notified from the terminal, and wherein the feedback information is generated in the terminal on the basis of any of a plurality of codebook subsets, selected on the basis of the communication mode, which are obtained by code-booking a precoding weight known to both the base station and the terminal, and a channel state between the base station and the terminal which is measured on the basis of the channel-state-measurement reference signal.

(8) According to one aspect of the present invention, there is provided a base station that communicates with a terminal, wherein the base station sets control information indicating whether an X-PDCCH region is set with respect to the terminal, transmits a channel-state-measurement reference signal to the terminal, and receives feedback information which is notified from the terminal, and wherein the feedback information is generated in the terminal on the basis of any of a plurality of codebook subsets, selected on the basis of the control information indicating whether the X-PDCCH region is set, which are obtained by code-booking a precoding weight known to both the base station and the terminal, and a channel state between the base station and the terminal which is measured on the basis of the channel-state-measurement reference signal.

(9) According to one aspect of the present invention, there is provided a communication system in which a base station and a terminal communicate with each other, wherein the base station sets a communication mode with respect to the terminal, and the terminal selects any of a plurality of codebook subsets obtained by code-booking a precoding weight known to both the base station and the terminal, on the basis of the communication mode.

(10) According to one aspect of the present invention, there is provided a communication system in which a base station and a terminal communicate with each other, wherein the base station sets control information indicating whether an X-PDCCH region is set with respect to the terminal, and the terminal selects any of a plurality of codebook subsets obtained by code-booking a precoding weight known to both the base station and the terminal, on the basis of the control information indicating whether the X-PDCCH region is set.

(11) According to one aspect of the present invention, there is provided a communication method for a terminal that communicates with a base station, including: a step of selecting any of a plurality of codebook subsets obtained by code-booking a precoding weight known to both the base station and the terminal, on the basis of a communication mode which is set by the base station.

(12) According to one aspect of the present invention, there is provided a communication method for a terminal that communicates with a base station, including: a step of selecting any of a plurality of codebook subsets obtained by code-booking a precoding weight known to both the base station and the terminal, on the basis of control information indicating whether an X-PDCCH region which is set by the base station is set.

(13) According to one aspect of the present invention, there is provided a communication method for a base station that communicates with a terminal, including: a step of setting a communication mode with respect to the terminal; a step of transmitting a channel-state-measurement reference signal to the terminal; and a step of receiving feedback information which is notified from the terminal, wherein the feedback information is generated in the terminal on the basis of any of a plurality of codebook subsets, selected on the basis of the communication mode, which are obtained by code-booking a precoding weight known to both the base station and the terminal, and a channel state between the base station and the terminal which is measured on the basis of the channel-state-measurement reference signal.

(14) According to one aspect of the present invention, there is provided a communication method for a base station that communicates with a terminal, including: a step of setting control information indicating whether an X-PDCCH region is set with respect to the terminal; a step of transmitting a channel-state-measurement reference signal to the terminal; and a step of receiving feedback information which is notified from the terminal, wherein the feedback information is generated in the terminal on the basis of any of a plurality of codebook subsets, selected on the basis of the control information indicating whether the X-PDCCH region is set, which are obtained by code-booking a precoding weight known to both the base station and the terminal, and a channel state between the base station and the terminal which is measured on the basis of the channel-state-measurement reference signal.

(15) According to one aspect of the present invention, there is provided a communication method for a communication system in which a base station and a terminal communicate with each other, including: a step of causing the base station to set a communication mode with respect to the terminal; and a step of causing the terminal to select any of a plurality of codebook subsets obtained by code-booking a precoding weight known to both the base station and the terminal, on the basis of the communication mode.

(16) According to one aspect of the present invention, there is provided a communication method for a communication system in which the base station and a terminal communicate with each other, including: a step of causing the base station to set control information indicating whether an X-PDCCH region is set with respect to the terminal; and a step of causing the terminal to select any of a plurality of codebook subsets obtained by code-booking a precoding weight known to both the base station and the terminal, on the basis of the control information indicating whether the X-PDCCH region is set.

Advantageous Effects of Invention

According to the present invention, it is possible to efficiently support a precoding process which is performed on a terminal by a base station.

BRIEF DESCRIPTION OF DRAWINGS

FIG. 6 is a diagram illustrating an example of a codebook subset 1.

FIG. 7 is a diagram illustrating an example of a codebook subset 2.

DESCRIPTION OF EMBODIMENTS

[First Embodiment]

Hereinafter, a first embodiment of the present invention will be described. A communication system in the first embodiment includes a base station (transmission device, cell, transmission point, transmission antenna group, transmission antenna port group, component carrier, and eNodeB) and a terminal (terminal device, mobile terminal, reception point, reception terminal, reception device, third communications device, reception antenna group, reception antenna port group, and UE).

Figure 1:
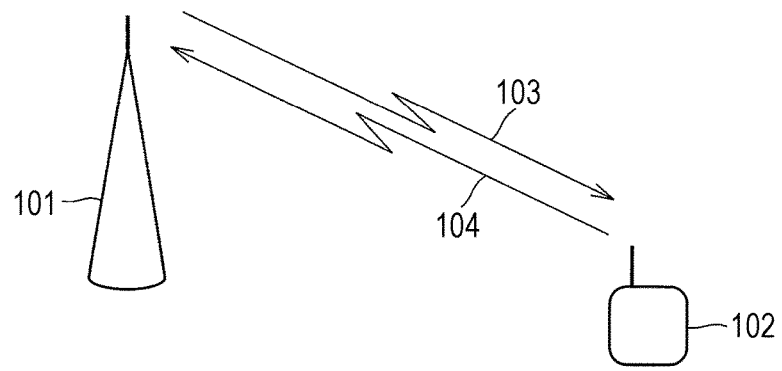
FIG. 1 is a schematic diagram illustrating an example in which adaptive control is performed when a downlink for performing data transmission according to a first embodiment of the present invention is considered.

FIG. 1 is a schematic diagram illustrating an example in which adaptive control is performed when a downlink for performing data transmission according to the first embodiment of the present invention is considered. In FIG. 1, a terminal 102 performs data communication with a base station 101. The terminal 102 receives a channel-state-measurement reference signal in the base station 101 which is transmitted through a downlink 103 between the base station 101 and the terminal 102. The terminal 102 estimates a channel state of a downlink 103 by using the channel-state-measurement reference signal in the base station 101. The terminal 102 generates information (feedback information) for performing adaptive control on the basis of the estimated channel state. The terminal 102 transmits the feedback information to the base station 101, using an uplink 104. The base station 101 performs adaptive control or scheduling of a data signal on the terminal 102, on the basis of the feedback information. The base station 101 transmits a data signal directed to the terminal 102, using the downlink 103.

Figure 2:
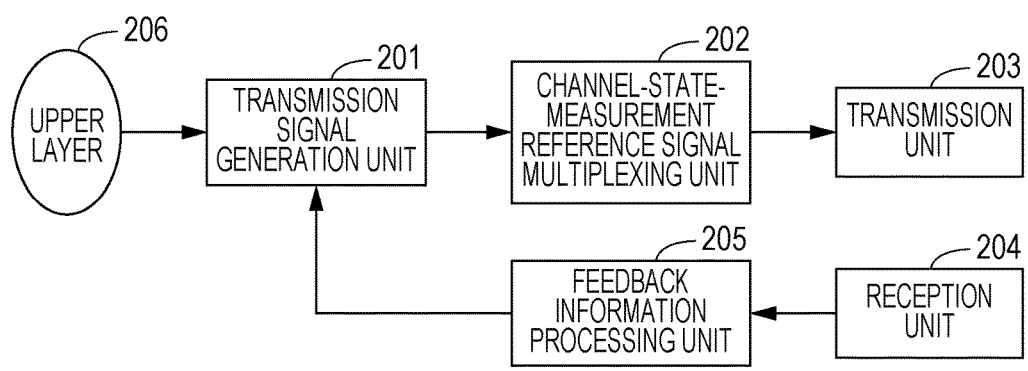
FIG. 2 is a schematic block diagram illustrating a configuration of a base station 101 according to the first embodiment of the present invention.

FIG. 2 is a schematic block diagram illustrating a configuration of the base station 101 according to the first embodiment of the present invention. Here, the base station 101 is a base station that receives the feedback information from the terminal 102, and a base station that transmits control information (for example, PDCCH (Physical Downlink Control Channel), and information transmitted through an upper layer) to the terminal 102.

In FIG. 2, the base station 101 includes a transmission signal generation unit 201, a channel-state-measurement reference signal multiplexing unit 202, a transmission unit 203, a reception unit 204, a feedback information processing unit 205, and an upper layer 206. Meanwhile, the control information is also referred to as a "control information signal" or a "control signal".

A data signal including the feedback information transmitted from the terminal 102 is received in the reception unit 204 through the uplink (for example, PUCCH (Physical Uplink Control Channel), PUSCH (Physical Uplink Shared Channel) or the like) 104.

The reception unit 204 performs a reception process on a transmission process in which an OFDM demodulation process, a demodulation process, a decoding process or the like is performed by the terminal 102 on a signal received by a reception antenna, for the purpose of signal transmission.

The reception unit 204 identifies feedback information from the received signal, and outputs the identified feedback information to the feedback information processing unit 205.

Meanwhile, when a plurality of terminals 102 that performs communication with the base station 101 are present, the base station 101 can multiplex the data signal of the terminal 102 with respect to the uplink 104, using various multiple access schemes such as SC-FDMA (Single Carrier-Frequency Division Multiple Access), Clustered DFT-S-OFDM (Discrete Fourier Transform-Spread-OFDM), OFDMA, time division multiple access, and code division multiple access. In addition, in the base station 101, various methods can be used as a method of identifying the feedback information for each terminal 102. For example, the base station 101 specifies a resource (element for signal transmission which is divided in a time, a frequency, a code, a spatial region and the like) in order for each terminal 102 to transmit the feedback information, and the terminal 102 transmits the feedback information based on the specified resource. Therefore, the base station 101 can identify the feedback information for each terminal 102. In addition, the identification thereof can also be realized by adding specific identification information or the like for each terminal 102 to each piece of the feedback information.

The feedback information processing unit 205 generates adaptive control information for performing adaptive control on a data signal transmitted to the terminal 102, on the basis of the input feedback information. When feedback information for the base station 101 is included, the feedback information processing unit 205 generates adaptive control information in the base station 101, and outputs the generated adaptive control information to the transmission signal generation unit 201.

The transmission signal generation unit 201 can perform adaptive control on a coding process, a modulation process, a layer mapping process, a precoding process, a resource element mapping process and the like in the base station 101, on the basis of the adaptive control information. In addition, the transmission signal generation unit 201 may output the adaptive control information to an upper layer which is not shown.

Here, a method of performing adaptive control based on the feedback information will be described. Although various information can be used in the feedback information, a case where recommended transmission format information (implicit channel state information) to a base station and information (explicit channel state information) indicating a channel state (channel state or transmission channel) are used will be described below.

First, when the recommended transmission format information for the base station is used as the feedback information, a known transmission format is assumed to be indexed in advance with respect to the base station and the terminal. The terminal feeds back information using the transmission format, and the base station performs adaptive control using the information. Specifically, since CQI (Channel Quality Indicator) is information indicating a coding and modulation scheme, the base station can control the coding process and the modulation process. Since PMI (Precoding Matrix Index) is information indicating a precoding matrix, the base station can control the precoding process. Since RI (Rank Indicator) is information indicating the number of layers, the base station can control the layer mapping process or the upper layer that generates a code word. In addition, when feedback information on mapping to a resource is also included, the base station can also control the resource element mapping process. Here, the PMI can also be divided into a plurality of types in accordance with the method, object, application and the like of data transmission, and the details thereof will be described later.

Next, when information indicating the channel state is used as the feedback information, the terminal 102 feeds back the information of a channel state between the base station 101 and the terminal to the base station 101, using the channel-state-measurement reference signal from the base station 101. On this occasion, the terminal 102 may reduce the amount of information indicating the channel state, using various methods such as eigenvalue decomposition or quantization. In the base station 101, control is performed on the terminal 102, using the fed-back channel state information.

For example, in the base station 101, the coding and modulation scheme, the number of layers and the precoding matrix can be determined so that optimum reception is possible when reception is performed by the terminal 102, on the basis of the fed-back information. As the method, various methods can be used.

The upper layer 206 generates a data signal for the terminal 102, and outputs the generated data signal to the transmission signal generation unit 201.

The transmission signal generation unit 201 performs adaptive control on the data signal which is output by the upper layer 206, on the basis of the adaptive control information which is output by the feedback information processing unit 205, and generates a transmission signal for the terminal 102. Specifically, the transmission signal generation unit 201 performs a coding process for performing error correction coding, a scrambling process for applying a scrambling code specific to the terminal 102, a modulation process for using a multilevel modulation scheme or the like, a layer mapping process for performing spatial multiplexing such as MIMO, a precoding process for performing phase rotation or beamforming, and the like.

Here, it is preferable that in the precoding process, the base station 101 perform phase rotation or the like on a signal to be generated so that the terminal 102 can efficiently receive a transmission signal for the terminal 102 (for example, received power becomes maximum, interference from an adjacent cell becomes small, or interference with an adjacent cell becomes small). In addition, the base station 101 can use a process using the precoding matrix determined in advance, CDD (Cyclic Delay Diversity), and transmission diversity (SFBC (Spatial Frequency Block Code), STBC (Spatial Time Block Code), TSTD (Time Switched Transmission Diversity), FSTD (Frequency Switched Transmission Diversity) or the like), but is not limited thereto. Here, when the division of the PMI into a plurality of types is fed back, the base station 101 computes the plurality of PMIs using multiplication or the like, thereby allowing the precoding process to be performed.

Here, before the precoding process is performed on a transmission signal, the base station 101 can multiplex data-signal-demodulation reference signals (DM-RS (Demodulation Reference Signal), DRS (Dedicated Reference Signal), Precoded RS, user-specific reference signal, UE-specific RS, and terminal-specific reference signal) in order for the terminal 102 to demodulate the transmission signal, with respect to the transmission signal. The precoding process is performed on the data-signal-demodulation reference signal together with the transmission signal to the terminal 102. In addition, the base station 101 orthogonalizes the data-signal-demodulation reference signals of the respective layer, using any of code division multiplexing (CDM) through an orthogonal code such as a Walsh code and frequency division multiplexing (FDM), or with a combination thereof.

In order to measure the channel state of the downlink 103 between the base station 101 and the terminal 102, the channel-state-measurement reference signal multiplexing unit 202 generates channel-state-measurement reference signals (cell-specific reference signal, CRS (Common RS), Cell-specific RS, and Non-precoded RS) known to both the base station 101 and the terminal 102, and multiplexes the input transmission signal. At this time, when both the base station 101 and the terminal 102 have known signals, the base station 101 can use an arbitrary signal (sequence) as the channel-state-measurement reference signal. The base station 101 can use, for example, a random number or a pseudo-noise sequence based on a parameter, allocated in advance, such as a number (cell ID) specific to the base station 101. In addition, the base station 101 can use, as a method of orthogonalization between antenna ports, a method of setting resource elements that maps the channel-state-measurement reference signal to be null (zero) to each other between antenna ports, a method of performing code division multiplexing using a pseudo-noise sequence, a method of using a combination thereof, or the like. Meanwhile, the channel-state-measurement reference signal may not be multiplexed to all the subframes, and may be multiplexed to only some of the subframes.

The transmission unit 203 performs a mapping process on the resource element of each antenna port, with respect to the transmission signal which is output by the channel-state-measurement reference signal multiplexing unit 202. The transmission unit 203 transmits the transmission signal on which the mapping process is performed, from a transmission antenna. Here, in the resource element mapping process, the control information is mapped to a PDCCH (Physical Downlink Control Channel) region, and an information data signal and the channel-state-measurement reference signal are mapped to a PDSCH region.

Figure 3:
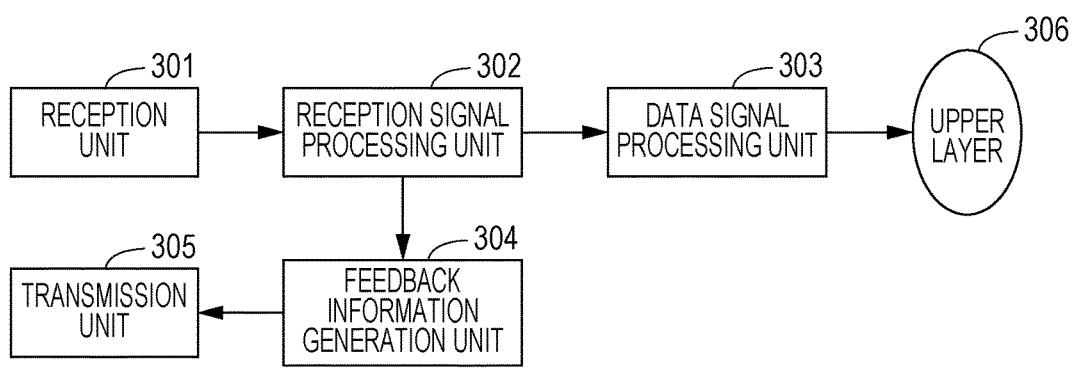
FIG. 3 is a schematic block diagram illustrating a configuration of a terminal 102 according to the first embodiment of the present invention.

FIG. 3 is a schematic block diagram illustrating a configuration of the terminal 102 according to the first embodiment of the present invention. In FIG. 3, the terminal 102 includes a reception unit 301, a reception signal processing unit 302, a data signal processing unit 303, a feedback information generation unit 304, a transmission unit 305, and an upper layer 306.

The reception unit 301 receives a signal transmitted by the base station 101 through the reception antennas having a number of reception antennas of at least one (number of reception antenna ports). The reception unit 301 performs a process or the like of transforming the received signal (radio frequency signal) into a baseband signal. The reception signal processing unit 302 transforms a signal of a frequency region into the baseband signal by (i) removing a guard interval added from the baseband signal obtained by the transformation and (ii) performing a time frequency transform process through fast Fourier transform (FFT) or the like, with respect to the baseband signal in which the guard interval is removed. In addition, the reception signal processing unit 302 demaps (separates) a signal which is mapped in the base station 101. When a data signal addressed to the terminal 102 is included in the demapped signal, the reception signal processing unit 302 outputs the data signal to the data signal processing unit 303. When a channel-state-measurement reference signal is included in the demapped signal, the reception signal processing unit 302 outputs the channel-state-measurement reference signal to the feedback information generation unit 304. In addition, the control information is shared in the entire terminal 102 (also including an upper layer), and is used in various control of the demodulation of the data signal or the like in the terminal 102 (not shown).

The data signal processing unit 303 performs a channel estimation process, a channel compensation process (filtering process), a layer demapping process, a demodulation process, a descrambling process, a decoding process and the like, with respect to the input data signal. The data signal processing unit 303 outputs the data signal on which these processes are performed, to the upper layer 306. In the channel estimation process, the data signal processing unit 303 obtains a channel estimation value by estimating (performing a channel estimation) variations (frequency response, transfer function) in an amplitude and a phase in each of the resource elements with respect to each layer (rank, spatial multiplexing), on the basis of the data-signal-demodulation reference signal multiplexed to the input data signal. Meanwhile, regarding a resource element in which the data-signal-demodulation reference signal is not mapped, the data signal processing unit 303 performs interpolation in a frequency direction and a time direction, on the basis of a resource element in which the data-signal-demodulation reference signal is mapped, to thereby perform a channel estimation. In the channel compensation process, the data signal processing unit 303 detects (restores) a data signal for each layer by performing channel compensation using the estimated channel estimation value with respect to the input data signal. As the detection method, the data signal processing unit 303 can use the equalization of a ZF (Zero Forcing) reference or a MMSE (Minimum Mean Square Error) reference, interference cancellation or the like. In the layer demapping process, the data signal processing unit 303 performs a process of demapping a signal for each layer to each code word. Thereafter, the data signal processing unit 303 performs a process for each code word. In the demodulation process, the data signal processing unit 303 performs demodulation on the basis of the used modulation scheme. In the descrambling process, the data signal processing unit 303 performs the descrambling process on the basis of the used scrambling code. In the decoding process, the data signal processing unit 303 performs an error correction decoding process on the basis of the applied coding method.

On the other hand, the feedback information generation unit 304 generates feedback information on the basis of the input channel-state-measurement reference signal.

Figure 4:
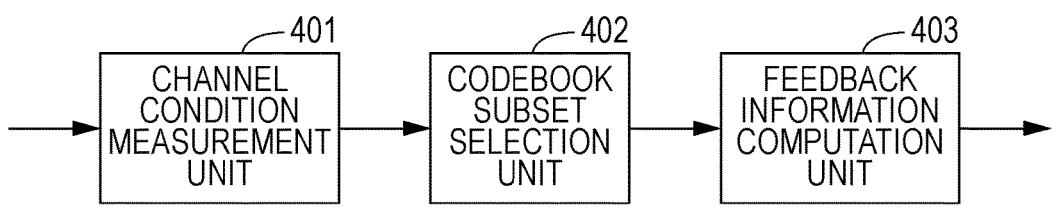
FIG. 4 is a schematic block diagram illustrating a configuration of a feedback information generation unit 304 according to the first embodiment of the present invention.

FIG. 4 is a schematic block diagram illustrating a configuration of the feedback information generation unit 304 according to the first embodiment of the present invention. In FIG. 4, the feedback information generation unit 304 includes a channel state measurement unit 401, a codebook subset selection unit 402, and a feedback information computation unit 403.

The channel state measurement unit 401 generates a channel state measurement value by measuring the channel state of the transmission antenna in the base station with respect to the reception antenna in the terminal 102, using the received channel-state-measurement reference signal. Next, control information indicating a transmission mode is input to the codebook subset selection unit 402. The codebook subset selection unit 402 selects a codebook subset used when the feedback information of the PMI is generated, on the basis of the input transmission mode. The details thereof will be described later. Next, the feedback information computation unit 403 computes the feedback information on the basis of the generated channel state estimation value and the selected codebook subset.

In addition, the feedback information computation unit 403 can use, as a unit to generate the feedback information, a frequency direction (for example, every subcarrier, every resource element, every resource block, every subband constituted by a plurality of resource blocks, or the like), a time direction (for example, every OFDM symbol, every subframe, every slot, every radio frame, or the like), a spatial direction (for example, every antenna port, every transmission antenna, every reception antenna, or the like), or the like. The feedback information computation unit 403 can also use a combination thereof, as a unit to generate the feedback information.

In addition, in the feedback information computation unit 403, when recommended transmission format information for the base station is generated as the feedback information, various methods can be used in the generation thereof. For example, the feedback information computation unit 403 first obtains the maximum number of layers capable of spatial multiplexing using eigenvalue decomposition or the like, on the basis of the generated channel state estimation value, and then generates RI. The feedback information computation unit 403 estimates a precoding matrix (precoding weight) or the like which is capable of suitable reception, on the basis of the generated RI and channel state estimation value, and then generates PMI. In the generation of the PMI, the feedback information computation unit 403 may multiply, for example, the generated channel state estimation value by a candidate precoding matrix, and may select a precoding matrix which is suitable at the time of performing cooperative communication. In addition, the feedback information computation unit 403 may select a suitable precoding matrix from the candidate precoding matrices, using eigenvalue decomposition or the like. At this time, the candidate precoding matrix is determined on the basis of input codebook subset restriction information. Next, the feedback information computation unit 403 selects a modulation and coding scheme for the information data signal, on the basis of the generated RI, PMI and channel state estimation value, and then generates CQI. In the generation of the CQI, the feedback information computation unit 403 may, for example, (i) measure SINR (Signal to Interference plus Noise power Ratio), SIR (Signal to Interference power Ratio), SNR (Signal to Noise power Ratio), a path loss or the like, (ii) preset a look-up table of the CQI that satisfies required qualities with respect to these measurement values, (iii) obtain the SINR at the time of performing the cooperative communication, and (iv) determine the CQI from the look-up table.

The generated feedback information is input to the transmission unit 305. In order to transmit (feed back) the feedback information which is output by the feedback information generation unit 304 to the base station 101, the transmission unit 305 performs a coding process, a modulation process, an OFDM signal generation process, a guard interval insertion process, a frequency transformation process or the like, and then generates an uplink transmission signal. Further, the transmission unit 305 transmits the generated uplink transmission signal to the base station 101 through an uplink (PUCCH or PUSCH).

In addition, in a method of feeding back the uplink transmission signal, including the feedback information generated as mentioned above, to the base station 101, the uplink transmission signal is divided into a plurality of subframes through, for example, the PUCCH specified by the base station 101, and thus can be transmitted. In addition, all or part of the generated feedback information can also be transmitted as one subframe through the PUSCH specified by the base station 101. On this occasion, all or part thereof may be transmitted together with the information data signal from the terminal 102.

Figure 5:
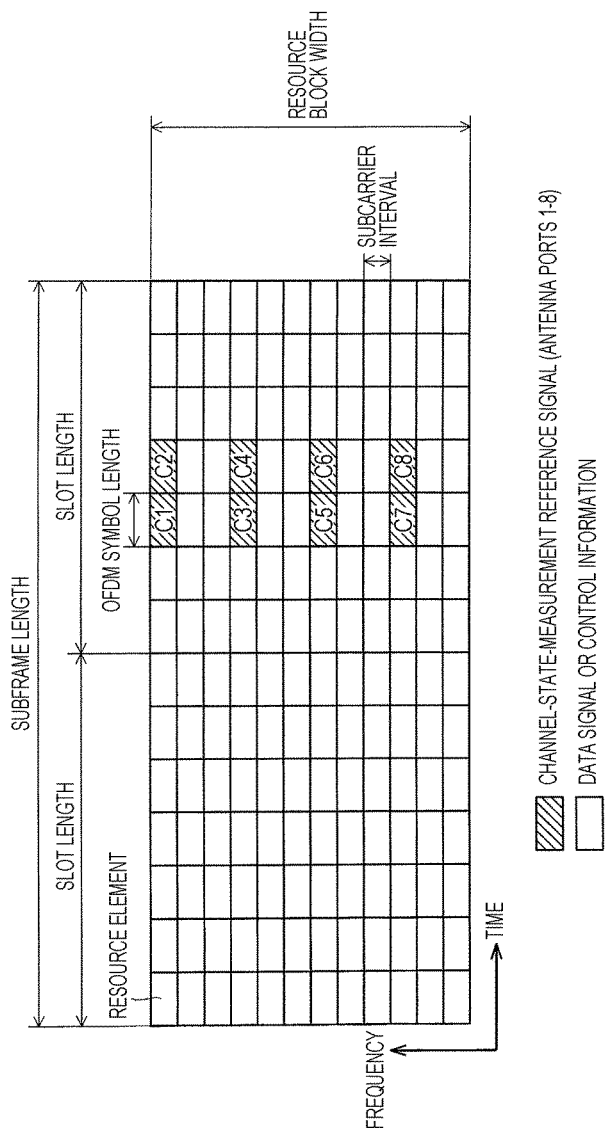
FIG. 5 is a diagram illustrating an example of channel-state-measurement reference signals, data signals or control information which is mapped by the base station 101.

FIG. 5 is a diagram illustrating an example of the channel-state-measurement reference signal, the data signal or the control information mapped by the base station 101. In FIG. 5, a case where each signal is mapped is shown when the number of antenna ports of the base station 101 is 8. In addition, FIG. 5 shows two resource blocks (resource block pair), and one resource block is constituted by 12 subcarriers in a frequency direction and 7 OFDM symbols in a time direction. Each of the subcarriers in one OFDM symbol is called a resource element. The resource block pairs are lined up in a frequency direction, and the number of resource block pairs can be set for each base station terminal. For example, the number of resource block pairs can be set to 6 to 110. The width in a frequency direction on this occasion is called a system bandwidth.

In addition, the time direction of the resource block pair is called a subframe. In each of the subframes, seven OFDM symbols which are leading and trailing in a time direction are also called slots, respectively.

Hatched resource elements are channel-state-measurement reference signals of CSI antenna ports 1 to 8 (antenna ports 15 to 22), and the respective channel-state-measurement reference signals are denoted by C1 to C8. In addition, the base station 101 maps the data signal or the control information to white-colored resource elements. Meanwhile, the maximum number of layers (the number of ranks) of the data signal or the control information can be set to 8. For example, the number of layers of the data signal can be set to 2, and the number of layers of the control information can be set to 1.

Here, the control information is mapped to a PDCCH region, and the data signal and the channel-state-measurement reference signal are mapped to a PDSCH region. For example, in FIG. 5, the leading 1 to 4 OFDM symbols in one subframe can be set as the PDCCH region, and the remaining 10 to 13 OFDM symbols can be set as the PDSCH region.

Here, the number of resource blocks can be changed in accordance with the frequency bandwidth (system bandwidth) used by the communication system. The communication system can use, for example, 6 to 110 resource blocks, and the unit thereof is also called a component carrier. Further, in the base station 101, a plurality of component carriers can also be set by frequency aggregation with respect to the terminal 102. For example, in the base station 101, one component carrier is configured to be set to 20 MHz with respect to the terminal 102, and five component carriers are set continuously and/or discontinuously in a frequency direction, thereby allowing a bandwidth capable of being used by the entire communication system to be set to 100 MHz.

The position and signal sequence to which the channel-state-measurement reference signal is mapped may be notified or reported to the terminal 102 as the control information (also including signaling of the upper layer (for example, RRC; Radio Resource Control)), and may be identified by the terminal 102 on the basis of other control information such as a cell ID. In addition, only the position and signal sequence to which the channel-state-measurement reference signal for one antenna port out of a plurality of antenna ports is mapped can be notified, reported or identified, and the channel-state-measurement reference signals for other antenna ports can also be identified on the basis of the position and signal sequence.

Hereinafter, a codebook subset selection method and feedback information of PMI which are used in the first embodiment of the present invention will be described. In addition, in the following, a codebook is a code-booked precoding weight known to both the base station 101 and the terminal 102. A codebook subset is a small group of the codebook.

In the first embodiment of the present invention, a plurality of codebook subsets are specified in advance, and both the base station 101 and the terminal 102 know the plurality of codebook subsets. In addition, each of the codebook subsets is specified by the number of antenna ports of the base station 101.

Hereinafter, as an example, a case will be described in which a codebook subset 1 (first codebook subset) and a codebook subset 2 (second codebook subset) are used as two codebook subsets. In the following example, the codebook subset 1 is a codebook subset which is used even in a lower-level terminal in a communication system that holds backward compatibility. The codebook subset 2 is a codebook subset which is not used in a lower-level terminal in the communication system that holds backward compatibility. For example, the codebook subset 1 is a codebook subset which is used in a system (terminal) up to LTE Release 10. The codebook subset 2 is a codebook subset which is used in a system (terminal) under LTE Release 11.

FIG. 6 is a diagram illustrating an example of the codebook subset 1. In the codebook subset 1, the terminal 102 shows a suitable precoding weight, using one PMI. FIG. 6 shows the codebook subset 1 when the number of antenna ports is 2. In addition, FIG. 6 shows four codebooks (W1_10, W1_11, W1_12, and W1_13) when the number of ranks is 1, and two codebooks (W1_21 and W1_22) when the number of ranks is 2. That is, when the number of antenna ports is 2, the number of codebooks becomes 6.

In addition, the codebook subset 1 when the number of antenna ports is 4 is specified in a case where the number of ranks is 1 to 4. For example, the codebook subset 1 is constituted by 16 codebooks in a case where the number of ranks is 1 to 4. That is, when the number of antenna ports is 4, the number of codebooks becomes 64.

FIG. 7 is a diagram illustrating an example of the codebook subset 2. In the codebook subset 2, the terminal 102 shows a suitable precoding weight, using two PMIs. FIG. 7 shows a codebook subset when the number of antenna ports is 2 and the number of ranks is 1. In addition, each of the codebook subsets is specified by the number of ranks and the number of antenna ports of the base station 101 other than the above. The sizes of PMI1 and PMI2 in the codebook subset 2 are 16, respectively. In addition, the sizes of the PMI1 and the PMI2 in the codebook subset 2 may be specified differently for each of the number of ranks. In the codebook subset 2, a precoding weight indicated by the PMI1 is set to W, and a precoding weight indicated by the PMI2 is set to Φ. On this occasion, a precoding weight for performing the precoding process is obtained on the basis of W and Φ, and, for example, multiplication, weighting multiplication or the like is used.

Here, when the precoding weight for performing the precoding process is obtained by the multiplication of W by Φ, the codebook subset 2 can indicate 256 precoding weights in the example of FIG. 7. That is, as compared to the codebook subset 1, the codebook subset 2 can be set in order to perform a more detailed precoding process. Therefore, the codebook subset 2 can be set to a codebook subset suitable for realizing a cooperative multi point (CoMP) scheme or an expanded multi-user MIMO scheme from a plurality of base stations. Here, the expanded multi-user MIMO scheme can be defined, for example, as improving the number of users capable of multi-user MIMO and/or the maximum number of ranks per user. The expanded multi-user MIMO scheme can be defined as expanding the feedback information in order to realize more suitable beamforming.

In the determination of a suitable precoder, for example, in consideration of a downlink channel, a method or the like can be used in which such precoders W and Φ for which downlink reception signal power becomes maximum are selected from the codebook subset, and the indexes thereof are set to the PMI1 and the PMI2. In addition, the codebook subset 2 having the number of antenna ports of 2 is specified similarly to the case where the number of ranks is 2, in addition to the case where the number of ranks is 1 as described in FIG. 7. In addition, the codebook subset 2 is specified similarly to the case where the number of antenna ports is 4 and 8, in addition to the case where the number of antenna ports is 2 as described in FIG. 7. That is, the codebook subset 2 having the number of antenna ports of 4 is specified when the number of ranks is 1 to 4. In addition, the codebook subset 2 having the number of antenna ports of 8 is specified when the number of ranks is 1 to 8. In addition, in each of the codebook subsets, the number of codebooks can be specified differently depending on the number of antenna ports or the number of ranks.

Figure 8:
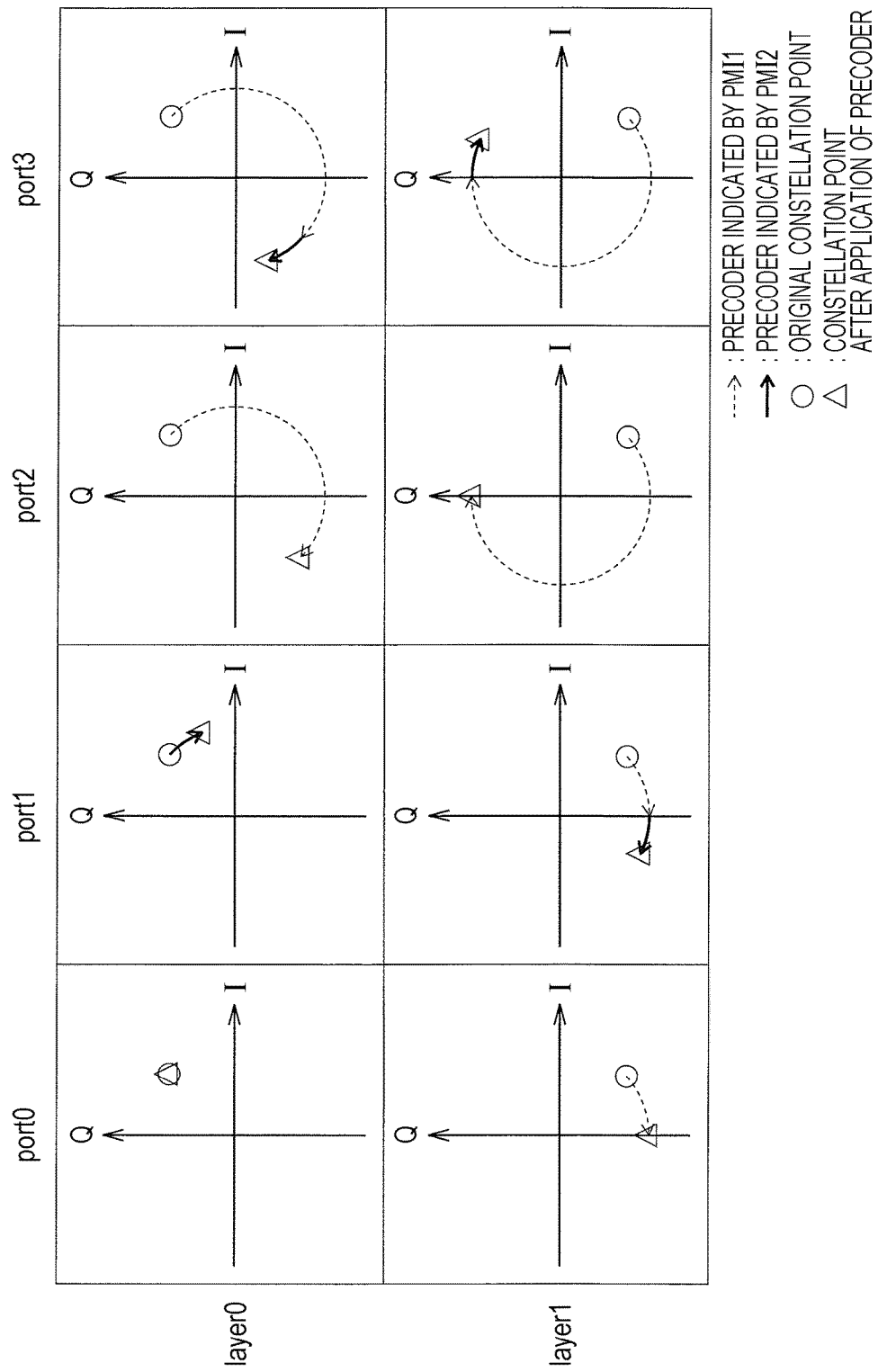
FIG. 8 is a schematic diagram of a precoding process when the codebook subset 2 is used.

FIG. 8 is a schematic diagram of the precoding process when the codebook subset 2 is used. Here, a case where the number of antenna ports is 4, the number of layers is 2, and F=WiΦj will be described. A constellation point in each antenna port of each layer is displaced (herein, a phase rotates in the range of 0 to $2\pi$) by Wi which is a precoder indicated by the PMI1. Further, a constellation point in each antenna port of each layer is displaced (herein, a phase rotates in the range of 0 to $2\pi$) by Φj which is a precoder indicated by the PMI2. At the time of first reporting the PMI1, the terminal determines a suitable precoder (precoder having a suitable constellation point after the application of a precoder) from the codebook formed of a precoder group that gives specific displacement to the constellation point in each antenna port of each layer. At the time of next reporting the PMI2, the terminal determines, from the codebook, a precoder having a suitable constellation point after the further application of a precoder to the constellation point after the application of the precoder indicated by the reported PMI1, and then reports the index thereof as the PMI2. Here, as the codebook used for determining the PMI2, a codebook as shown in FIG. 8 is used. Meanwhile, the displacement of a constellation point shown in FIG. 8 is an example, and is not limited thereto.

Here, the codebook subset 1 and the codebook subset 2 are information known in advance between the base station 101 and the terminal 102, and are information dependent on the number of antenna ports and the number of ranks of the base station 101. That is, the terminal 102 can identify the number of antenna ports of the base station 101 on the basis of control information reported by the base station 101, and can recognize a codebook subset used by the base station 101.

Figure 9:
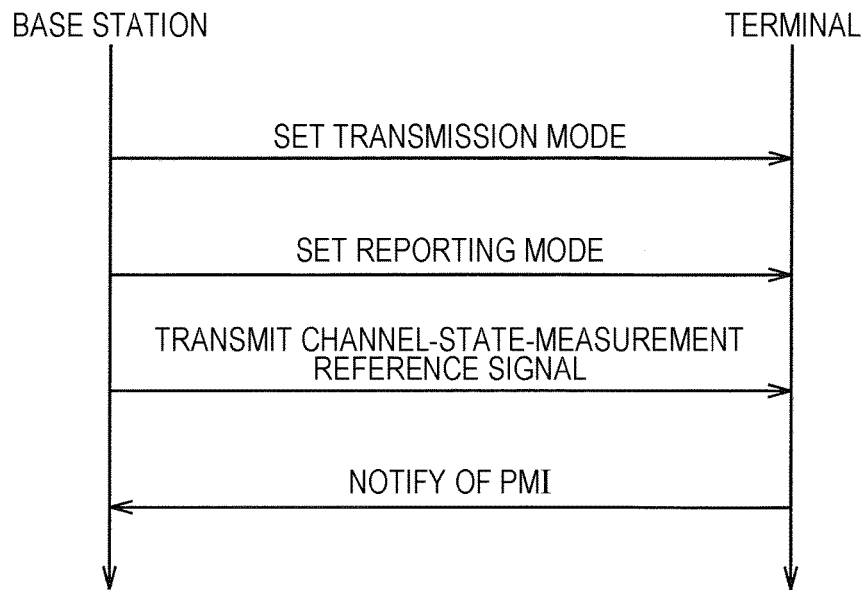
FIG. 9 is a diagram illustrating an example of a notification procedure of the control information according to the first embodiment of the present invention.

FIG. 9 is a diagram illustrating an example of a notification procedure of control information according to the first embodiment of the present invention. The codebook subset in the first embodiment of the present invention is selected on the basis of a transmission mode which is set by the base station 101 with respect to the terminal 102.

First, the base station 101 sets a transmission mode through signaling of the upper layer with respect to the terminal 102. The transmission mode is a communication scheme for performing setting with respect to the terminal of the base station. For example, the transmission mode is defined as a new transmission mode (transmission mode 10, or second transmission mode) different from a transmission mode (first transmission mode) of the related art which is defined in a communication system that holds backward compatibility.

Here, the first transmission mode is all or part of one or a plurality of transmission modes defined from the related art. For example, the first transmission mode is defined as transmission modes 1 to 9. The transmission mode 1 is a transmission mode in which a single antenna port transmission scheme using an antenna port 0 is used. The transmission mode 2 is a transmission mode in which a transmission diversity scheme is used. The transmission mode 3 is a transmission mode in which a cyclic delay diversity scheme is used. The transmission mode 4 is a transmission mode in which a closed-loop spatial multiplexing scheme is used. The transmission mode 5 is a transmission mode in which a multi-user MIMO scheme is used. The transmission mode 6 is a transmission mode in which the closed-loop spatial multiplexing scheme using a single antenna port is used. The transmission mode 7 is a transmission mode in which the single antenna port transmission scheme using an antenna port 5 is used. The transmission mode 8 is a transmission mode in which the closed-loop spatial multiplexing scheme using antenna ports 7 to 8 is used. The transmission mode 9 is a transmission mode in which the closed-loop spatial multiplexing scheme using antenna ports 7 to 14 is used.

In addition, the second transmission mode is defined as a transmission mode different from the first transmission mode, and is defined as, for example, the transmission mode 10. For example, the transmission mode 10 can be set to a transmission mode in which the cooperative multi point scheme is used from a plurality of base stations. In addition, the transmission mode 10 can be set to a transmission mode in which a communication scheme obtained by expanding (advancing) the multi-user MIMO scheme capable of being realized by the communication scheme shown in the transmission modes 1 to 9 is used.

In addition, the transmission mode 10 can be set to a transmission mode in which the multi-cell communication scheme and/or the expanded multi-user MIMO scheme is used, in addition to all or part of the communication schemes shown in the transmission modes 1 to 9. For example, the transmission mode 10 can be set to a transmission mode in which the multi-cell communication scheme and/or the expanded multi-user MIMO scheme is used, in addition to the communication scheme shown in the transmission mode 9.

In addition, the transmission mode 10 can be set to a transmission mode capable of setting a plurality of channel-state-measurement reference signals. In addition, the transmission mode 10 can be set to a transmission mode capable of setting the control information transmitted to the terminal 102 using a portion of the PDSCH region. For example, a portion of the PDSCH region to which such control information is transmitted is set to be specific to the terminal 102 or specific to the base station 101 as an X-PDCCH region. In addition, the control information transmitted using a portion of the PDSCH region multiplexes the data-signal-demodulation reference signal. The terminal 102 may demodulate the control information thereof using the data-signal-demodulation reference signal.

Meanwhile, when a data signal is transmitted to the terminal 102 which is set to be in the transmission mode 10 capable of using a plurality of transmission schemes, the base station 101 can perform communication without notifying that any of the plurality of transmission schemes is used. That is, when the data signal is received even in a case where the terminal 102 is set to be in the transmission mode 10 capable of using the plurality of transmission schemes, the terminal can perform communication without notifying that any of the plurality of transmission schemes is used.

Next, the base station 101 sets a reporting mode through signaling of the upper layer with respect to the terminal 102. The reporting mode in the present invention is a method of notifying the base station 101 of feedback information (reporting information) in order for the terminal 102 to perform adaptive control in a downlink. In addition, the reporting mode is defined corresponding to a transmission mode. In addition, the reporting mode can be set for each base station (for each CSI-RS to be set), and can also be set with respect to all or part of the plurality of base stations. Meanwhile, the setting of the reporting mode can be performed simultaneously with the setting of the transmission mode.

The terminal 102 selects any of the codebook subset 1 or the codebook subset 2 on the basis of the notified transmission mode. For example, the codebook subset 1 is selected when the first transmission mode is set, and the codebook subset 2 is selected when the second transmission mode is set.

The base station 101 transmits a channel-state-measurement reference signal to the terminal 102. The terminal 102 measures a channel state using the channel-state-measurement reference signal. The terminal 102 generates PMI on the basis of the selected codebook subset. The terminal 102 notifies the base station 101 of the generated PMI. The base station 101 can perform scheduling of data transmission to the terminal 102 on the basis of the notified PMI.

By using the method described above, the base station 101 can switch a codebook subset used by the terminal 102, on the basis of the transmission mode. That is, the base station 101 can cause the terminal 102 to select a codebook subset suitable for the transmission mode. Therefore, the base station 101 can efficiently perform the precoding process on the terminal 102.

Meanwhile, the terminal 102 may select any of a plurality of codebook subsets on the basis of the reporting mode which is set by the base station 101. For example, each of the codebook subsets can be specified as a codebook subset suitable for each of the reporting modes.

For example, the reporting mode corresponding to the codebook subset 1 can be set to a mode in which the feedback information is notified through the PUCCH. The reporting mode corresponding to the codebook subset 2 can be set to a mode in which the feedback information is notified through the PUSCH. Thereby, the base station 101 can switch a codebook subset used by the terminal 102, on the basis of the reporting mode. That is, the base station 101 can cause the terminal 102 to select a codebook subset suitable for the reporting mode. Therefore, the base station 101 can efficiently perform the precoding process on the terminal 102.

[Second Embodiment]

Hereinafter, a second embodiment of the present invention will be described. A communication system in the second embodiment of the present invention is the same as the communication system in the first embodiment of the present invention, but is different from that in a method in which the terminal 102 performs selection from a plurality of codebook subsets. Hereinafter, differences from portions described in the first embodiment of the present invention will be described.

The base station 101 in the second embodiment of the present invention can also map control information transmitted to the terminal 102 to a region which is set using a portion of the PDSCH region in addition to the PDCCH region.

Figure 10:
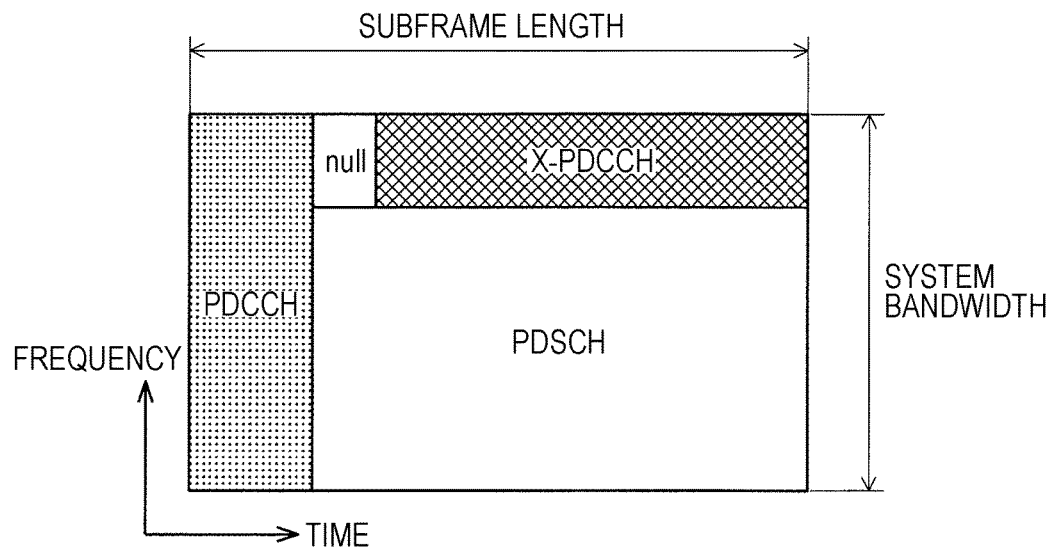
FIG. 10 is a diagram illustrating an example of a resource in a downlink according to a second embodiment of the present invention.

FIG. 10 is a diagram illustrating an example of a resource in a downlink according to the second embodiment of the present invention. In the resource shown in FIG. 10, in addition to the PDCCH and the PDSCH of the resource described in the first embodiment, a region to which the control information is notified can be added using a portion of the PDSCH region as the X-PDCCH. The base station 101 sets control information indicating whether the control information is transmitted through the X-PDCCH to the terminal 102, through signaling of the upper layer or signaling of the PDCCH. That is, the base station 101 sets control information indicating whether the X-PDCCH region capable of transmitting the control information from the base station 101 to the terminal 102 can be set using a portion of a resource capable of mapping an information data signal to the terminal 102. Further, when the control information is transmitted to the terminal through the X-PDCCH, the base station sets control information indicating the X-PDCCH region through signaling of the upper layer or signaling of the PDCCH.

Hereinafter, the setting (signaling) of the X-PDCCH region will be described. The region of the X-PDCCH in a frequency direction is allocated to a region having a predetermined number of resource blocks. As a method of allocating the region of the X-PDCCH in a frequency direction, the same method as the method of allocating the PDSCH for each terminal 102 can be used. For example, in the terminal 102, control information of a bitmap format indicating whether an allocation is performed for each resource block group using a plurality of resource blocks as a unit is set for each terminal, and thus the region of the X-PDCCH in a frequency direction is allocated.

A region of the X-PDCCH in a time direction is determined by a start position of an OFDM symbol within the subframe thereof. The start position of the X-PDCCH is specified in advance, and is set to, for example, a fourth OFDM symbol within the subframe. In addition, the start position of the X-PDCCH is notified by RRC signaling from the base station, and is set quasi-statically. In addition, when the PDCCH is constituted by first and second OFDM symbols and the start position of the X-PDCCH is the fourth OFDM symbol, a third OFDM symbol in the width of the resource block constituting the X-PDCCH is set to be null. In addition, other control information can be allocated to a region which is set to be null.

In addition, the subframe including the X-PDCCH region can be set for each terminal. For example, the base station 101 can set control information of an 8-bit bitmap format indicating whether the X-PDCCH region is included for each subframe, with respect to the terminal 102, using eight subframes as a period.

In addition, in the X-PDCCH, control information is mapped to the terminal which is set to be in a predetermined transmission mode (for example, transmission mode 10, or second transmission mode). The terminal 102 which is set to be in the predetermined transmission mode detects control information addressed thereto from the X-PDCCH region.

In addition, the base station 101 can notify the control information to a plurality of terminals 102 through the X-PDCCH. In addition, the control information notified through the X-PDCCH can be transmitted as control information notified through the PDCCH, and can be constituted by the same format as a DCI (Downlink Control Information) format notified through the PDCCH. In addition, the control information notified through the X-PDCCH can be constituted by a format (for example, DCI format 2E) different from the DCI format notified through the PDCCH. In addition, the control information notified through the X-PDCCH is also called third control information.

A data-signal-demodulation reference signal is multiplexed to the resource block including the X-PDCCH region. The terminal 102 demodulates the control information included in the X-PDCCH region, using the multiplexed data-signal-demodulation reference signal. That is, the X-PDCCH region may be used as a region for mapping the control information demodulated using the data-signal-demodulation reference signal. In addition, the X-PDCCH region may be used as a region for mapping the control information in which the data-signal-demodulation reference signal is multiplexed.

In an example in the second embodiment of the present invention, the terminal selects a codebook subset used from a plurality of codebook subsets, on the basis of control information indicating whether the X-PDCCH region capable of transmitting the control information from the base station 101 to the terminal 102 is set by the base station, using a portion of a resource capable of mapping an information data signal. That is, the control information indicating whether the X-PDCCH region is set is input to the codebook subset selection unit 402 described in FIG. 4. The codebook subset selection unit 402 selects a codebook subset which is used at the time of generating feedback information of PMI, on the basis of the control information indicating whether the input X-PDCCH region is set. For example, when the control information indicating whether the X-PDCCH region notified by the base station 101 is set shows that the X-PDCCH region is not set with respect to the terminal, the terminal 102 selects the codebook subset 1 described in the first embodiment of the present invention. In addition, when the control information indicating whether the X-PDCCH region notified by the base station is set shows that the X-PDCCH region is set with respect to the terminal 102, the terminal 102 selects the codebook subset 2 described in the first embodiment of the present invention.

In addition, in another example in the second embodiment of the present invention, the terminal 102 selects a codebook subset used from a plurality of codebook subsets, on the basis of whether the X-PDCCH region is set by the base station 101. That is, in the codebook subset selection unit 402 described in FIG. 4, whether the X-PDCCH region is set is identified. The codebook subset selection unit 402 selects a codebook subset used at the time of generating the feedback information of the PMI, on the basis of whether the identified X-PDCCH region is set. For example, when the XPDCCH region is not set by the base station 101, the terminal 102 selects the codebook subset 1 described in the first embodiment of the present invention. When the X-PDCCH region is set by the base station 101, the terminal selects the codebook subset 2 described in the first embodiment of the present invention.

By using the method described above, the base station 101 can switch a codebook subset used by the terminal 102, on the basis of whether the X-PDCCH region is set. Therefore, it is possible to efficiently perform a precoding process on the terminal 102.

Meanwhile, in each of the above-mentioned embodiments, description has been made using the resource element or the resource block as mapping units of the information data signal, the control information, the PDSCH, the PDCCH and the reference signal, and using the subframe or the radio frame as a transmission unit in a time direction, but is not limited thereto. Even in a case where the region constituted by an arbitrary frequency and time and the time unit are used instead thereof, the same effect can be obtained. Meanwhile, in each of the above-mentioned embodiments, description has been made of a case where demodulation is performed using RS on which the precoding process is performed, and description has been made using a port equivalent to the layer of MIMO as a port corresponding to the RS on which the precoding process is performed, but are not limited thereto. In addition to this, the present invention is applied to ports corresponding to reference signals different from each other, thereby allowing the same effect to be obtained. For example, using Unprecoded RS rather than Precoded RS, a port equivalent to an output terminal after the precoding process or a port equivalent to a physical antenna (or combination of physical antennas) can be used as the port.

A program operating in the base station 101 and the terminal 102 according to the present invention is a program (program causing a computer to function) for controlling a CPU and the like so as to realize functions of the above-mentioned embodiments according to the present invention. Information handled in these devices is temporarily accumulated in a RAM at the time of its processing, is then stored in various types of ROMs or HDDs, and reading, correction and writing are, as necessary, performed thereon by a CPU. A recording medium having a program stored thereon may be any of semiconductor mediums (such as, for example, a ROM and a nonvolatile memory card), optical recording mediums (such as, for example, a DVD, a MO, a MD, a CD, and a BD), magnetic recording mediums (such as, for example, a magnetic tape and a flexible disk) and the like. In addition, not only the functions of the above-mentioned embodiments may be realized by executing a loaded program, but also the function of the present invention may be realized by performing processing in cooperation with an operating system, other application programs or the like, on the basis of the instruction of the program.

In addition, when distributed to the market, a program can be distributed in a state where the program is stored in a portable recording medium, or can be transmitted to a server computer connected through a network such as the Internet. In this case, a storage device of the server computer is also included in the present invention. In addition, all or part of the base station 101 and the terminal 102 in the above-mentioned embodiments may be typically realized as an LSI which is an integrated circuit. The respective functional blocks of the base station 101 and the terminal 102 may be individually formed into a chip, all or part thereof may be integrated and formed into a chip. In addition, a method of forming an integrated circuit may be realized by a dedicated circuit or a general-purpose processor without being limited to an LSI. In addition, when technology for forming an integrated circuit replaced by an LSI appears with the development of semiconductor technology, it is also possible to use an integrated circuit to which the technology is applied.

As sated above, although the embodiments of the present invention have been described in details with reference to the accompanying drawings, the specific configurations are not limited to the embodiments, but design changes can be made without departing from the scope of the present invention. In addition, the present invention can be modified in various ways as long as such modification falls within the scope of the claims, and an embodiment derived from a proper combination of technical means disclosed in different embodiments is also encompassed in the technical scope of the present invention. In addition, a configuration can also be made in which elements which are disclosed in each of the above-mentioned embodiments and exhibit the same effect are replaced with each other.

INDUSTRIAL APPLICABILITY

The present invention is suitable for using a wireless base station device, a wireless terminal device, a wireless communication system, and a wireless communication method.

REFERENCE SIGNS LIST 101 base station
102 terminal
103 downlink
104 uplink
201 transmission signal generation unit
202 channel-state-measurement reference signal multiplexing unit
203, 305 transmission unit
204, 301 reception unit
205 feedback information processing unit
206, 306 upper layer
302 reception signal processing unit
303 data signal processing unit
304 feedback information generation unit
401 channel state measurement unit
402 codebook subset selection unit
403 feedback information computation unit

The invention claimed is:

1. A terminal that is configured to communicate with a base station, comprising:
a feedback information generator configured to generate a precoding matrix indicator which corresponds to one of a codebook index in a first codebook, and a pair of codebook indices in a second codebook, for four antenna ports, whether the precoding matrix indicator corresponds to the codebook index in the first codebook or the pair of codebook indices in the second codebook is determined based on a parameter configured by a higher layer; and
a transmitter configured to report the precoding matrix indicator, wherein
the precoding matrix indicator is selected using codebook subset restriction,
the codebook index in the first codebook indicates one of matrices in the first codebook,
the pair of codebook indices in the second codebook indicates one of matrices in the second codebook, and
a rank of the one of matrices in the first codebook is the same as a rank of the one of matrices in the second codebook.

2. The terminal according to claim 1, wherein the parameter is configured for each reporting configuration which is associated with a channel state information reference signal.

3. The terminal according to claim 1, wherein
the feedback information generator is configured to generate a channel quality indicator which is calculated assuming use of a precoding matrix corresponding to the precoding matrix indicator, and
the transmitter is configured to report the channel quality indicator.

4. The terminal according to claim 1, wherein
the parameter is configured only in a given transmission mode with the given number of antenna ports.

5. A base station that is configured to communicate with a terminal, comprising:
a higher layer processor configured to configure a parameter for the terminal; and
a receiver configured to receive a precoding matrix indicator which corresponds to one of a codebook index in a first codebook, and a pair of codebook indices in a second codebook, for four antenna ports, whether the precoding matrix indicator corresponds to the codebook index in the first codebook or the pair of codebook indices in the second codebook is determined based on the parameter configured by a higher layer, wherein
the precoding matrix indicator is selected using codebook subset restriction,
the codebook index in the first codebook indicates one of matrices in the first codebook,
the pair of codebook indices in the second codebook indicates one of matrices in the second codebook, and
a rank of the one of matrices in the first codebook is the same as a rank of the one of matrices in the second codebook.

6. The base station according to claim 5, wherein
the parameter is configured for each reporting configuration which is associated with a channel state information reference signal.

7. The base station according to claim 5, wherein the receiver is configured to receive a channel quality indicator which is calculated assuming use of a precoding matrix corresponding to the precoding matrix indicator.

8. The base station according to claim 5, wherein,
the parameter is configured only in a given transmission mode with the given number of antenna ports.

9. A communication method for a terminal that is configured to communicate with a base station, comprising the steps of:
generating a precoding matrix indicator which corresponds to one of a codebook index in a first codebook, and a pair of codebook indices in a second codebook, for four antenna ports, whether the precoding matrix indicator corresponds to the codebook index in the first codebook or the pair of codebook indices in the second codebook is determined based on a parameter configured by a higher layer; and
reporting the precoding matrix indicator, wherein
the precoding matrix indicator is selected using codebook subset restriction,
the codebook index in the first codebook indicates one of matrices in the first codebook,
the pair of codebook indices in the second codebook indicates one of matrices in the second codebook, and
a rank of the one of matrices in the first codebook is the same as a rank of the one of matrices in the second codebook.

10. A communication method for a base station that is configured to communicate with a terminal, comprising the steps of:

configuring a parameter for the terminal; and receiving a precoding matrix indicator which corresponds to one of a codebook index in a first codebook and a pair of codebook indices in a second codebook, for four antenna ports, whether the precoding matrix indicator corresponds to the codebook index in the first codebook or the pair of codebook indices in the second codebook is determined based on the parameter configured by a higher layer, wherein the precoding matrix indicator is selected using codebook subset restriction, the codebook index in the first codebook indicates one of matrices in the first codebook, the pair of codebook indices in the second codebook indicates one of matrices in the second codebook, and a rank of the one of matrices in the first codebook is the same as a rank of the one of matrices in the second codebook.

* * * * *